(12) United States Patent
Howe et al.

(10) Patent No.: US 10,112,317 B2
(45) Date of Patent: Oct. 30, 2018

(54) NANOTUBE PARTICLE DEVICE AND METHOD FOR USING THE SAME

(71) Applicant: The Boeing Company, Chicago, IL (US)

(72) Inventors: Wayne R. Howe, Irvine, CA (US); Jeffrey H. Hunt, Thousand Oaks, CA (US); Angela W. Li, Everett, WA (US); Dennis L. Coad, Madison, AL (US)

(73) Assignee: THE BOEING COMPANY, Chicaco, IL (US)

( * ) Notice: Subject to any disclaimer, the term of this patent is extended or adjusted under 35 U.S.C. 154(b) by 801 days.

(21) Appl. No.: 14/493,041

(22) Filed: Sep. 22, 2014

(65) Prior Publication Data
US 2016/0082617 A1    Mar. 24, 2016

(51) Int. Cl.
| | |
|---|---|
| *B28B 1/00* | (2006.01) |
| *B82B 1/00* | (2006.01) |
| *B33Y 10/00* | (2015.01) |
| *B33Y 30/00* | (2015.01) |
| *B33Y 50/02* | (2015.01) |

(52) U.S. Cl.
CPC .............. *B28B 1/001* (2013.01); *B82B 1/001* (2013.01); *B33Y 10/00* (2014.12); *B33Y 30/00* (2014.12); *B33Y 50/02* (2014.12)

(58) Field of Classification Search
CPC ....................................................... B28B 1/001
See application file for complete search history.

(56) References Cited

U.S. PATENT DOCUMENTS

| | | |
|---|---|---|
| 8,159,157 B1 | 4/2012 | Imholt |
| 2003/0151352 A1 | 8/2003 | Yamaguchi |
| 2005/0077468 A1 | 4/2005 | Baur et al. |

FOREIGN PATENT DOCUMENTS

| | | |
|---|---|---|
| JP | H06-283129 A | 10/1994 |
| JP | 2002-267590 A | 9/2002 |
| JP | 2003-208855 A | 7/2003 |
| JP | 2007-214117 A | 8/2007 |

OTHER PUBLICATIONS

Choi et al. ("Chemically driven carbon-nanotube-guided thermopower waves" Nature Materials, vol. 9, pp. 423-429).*

(Continued)

*Primary Examiner* — Larry Thrower
(74) *Attorney, Agent, or Firm* — MH2 Technology Law Group LLP

(57) ABSTRACT

A nanotube particle device for two dimensional and three dimensional printing or additive/subtractive manufacturing. The nanotube particle device comprising a nanotube, a particle shooter, a positioning mechanism, and a detection sensor. The particle shooter shoots a particle down the nanotube towards a target, the detection sensor senses the collision of the particle with the target, and the positioning mechanism re-adjusts the positioning of the nanotube based on the results of the collision. A method for aiming the particle shooter and additive/subtractive manufacturing are also disclosed and described.

13 Claims, 11 Drawing Sheets

(56) References Cited

OTHER PUBLICATIONS

HLA, STM Single Atom/Molecule Manipulation and Its Application to Nanoscience and Technology, Critical Review Article, J. Vac. Sci. Tech., 2005.
Wang, et al., Doping Monolayer Graphene with Single Atom Substitutions, NANO letters, American Chemical Society, 2011, pp. 141-144.
HLA, Single atom extraction by scanning tunneling microscope tiperash and nanoscale surface engineering, NANO letters 2004, vol. 4, No. 10.
Chen, et al., Optical nano-imaging of gate-tunable graphene plasmons, Nature 487,77-81(Jul. 5, 2012).
Pei, et al., Gate-tuning of graphene plasmons revealed by infrared nano-imaging, Nature 487, 82-85 (Jul. 5, 2012).
Extended European Search Report issued Mar. 1, 2016 in corresponding European Application No. 15186303.2.
Ivanova, "Additive Manufacturing (AM) and Nanotechnology: Promises and Challenges," Rapid Prototyping Journal, vol. 19, No. 5, Jul. 26, 2013, pp. 353-364.
Office Action dated Aug. 27, 2018 in correspondence Japanese Application No. 2015-136862.

\* cited by examiner

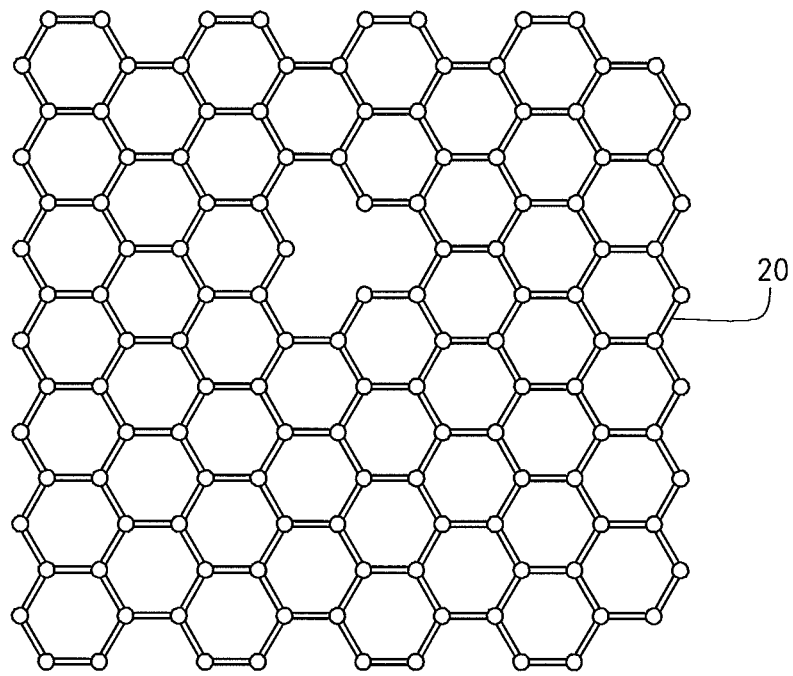
FIG. 8A1
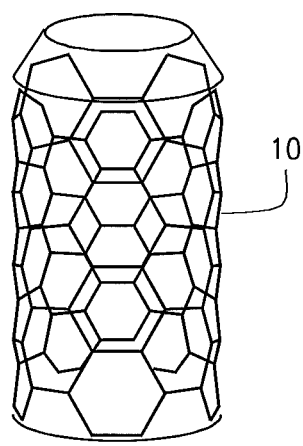
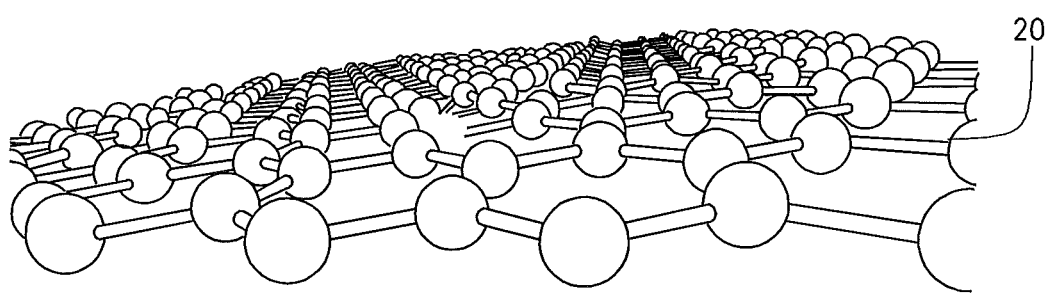
FIG. 8A2

NANOTUBE PARTICLE DEVICE AND METHOD FOR USING THE SAME

FIELD

The present disclosure relates to a nanotube particle device, aimer and shooter and method for aiming a particle shooter. The present disclosure also relates to a method for two dimensional and three dimensional printing or additive/subtractive manufacturing using a nanotube particle device.

BACKGROUND

Layered two dimensional (2D) and three dimensional (3D) arrays of particles are now being used in the production and manufacture of many different items. An example of a device using such layered arrays is a 3D printer. The term 3D printer is a general term which includes devices which perform additive and/or subtractive manufacturing Currently, 2D and 3D devices do not print or produce layers atom-by-atom or particle-by-particle. Instead, to place particles onto a substrate or an existing layer, current devices and methods simply bombard the surface with particles and then analyze the surface to determine if anything has stuck to the surface of the substrate or existing layer. With current 2D/3D devices and methods, there is no way to control where particles actually go, nor do current 2D/3D devices and methods control how many particles are placed on the substrate or layer.

Frequently, graphene is used for layers for 3D printing. Graphene is an allotrope of carbon. Its structure is one-atom thick planar sheets of $sp^2$-bonded carbon atoms that are densely packed in a honeycomb lattice. In many cases, honeycomb lattice imperfections due to manufacturing defects may cause issues in the production and manufacturing of 2D and 3D structures.

There are advantages to removing carbon atoms, leaving "holes" in a graphene sheet. Currently, this can be achieved using several different mechanisms including mechanical breakage of the carbon-carbon bond using an STM tip, using a photonic crystal, or an ion or proton beam. Current devices, however, do not have an aiming capability, and particles are simply bombarded onto the graphene. In addition, current devices can crash or plunge into the graphene and destroy the surface area of the graphene and/or destroy the device.

Accordingly, there is a need for a device that can be controlled and aimed at a specific location or particle in a substrate, layer, 2D, or 3D structure. There is also a need for a device and a method for preparing one or more layers of particles on a particle-by-particle basis.

SUMMARY

The disclosed embodiments include a nanotube as a particle device, a particle aimer, a particle shooter, an atomic doper, and/or a molecular manipulator. A further embodiment is directed to a method of aiming the particle shooter, and a method of additive/subtracting manufacturing and/or 2D or 3D printing using the nanotube particle device.

In an embodiment of the present disclosure, a particle is shot or propelled through a nanotube and onto a target, such as a graphene layer. The graphene layer is coupled to a data reader or sensor capable of detecting vibrations or changes in electrical signals and/or oscillations or effects in physical, mechanical, or optical signals. The vibrational, electrical, physical, and/or optical signals correspond to the types of interactions generated by shooting particles at the graphene layer. For example, a different type of interaction would be observed for a particle that was shot directly at the center of a hexagon carbon ring (i.e., particle would pass unabated through the center of the ring) as compared to an interaction observed by a particle that was shot directly at a carbon atom of the hexagon ring and collided with that carbon atom (e.g., strong vibrations and other effects can be observed due to the direct collision).

According to one embodiment, a nanotube particle device is provided comprising a nanotube having a first end and a second end; a particle shooter, wherein the particle shooter is coupled to the first end of the nanotube and wherein the particle shooter is configured to shoot a particle from the nanotube, possibly from the first end of the nanotube, to a target located beyond the second end of the nanotube; a positioning mechanism, wherein the positioning mechanism is configured to position the nanotube in relation to the target; and a detection sensor, wherein the detection sensor is configured to receive and transmit energy or movement emanating from an interaction between the particle and the target to the positioning mechanism and to determine the relative position of the nanotube device to the target. In one aspect, the nanotube is a carbon nanotube, the particle shooter is a laser, and the particle is a photon, an electron, a proton, an atom or a molecule. In another aspect, the particle shooter is configured to shoot a particle at a low power for positioning the nanotube and configured to shoot one or more particles at a higher power for displacing one or more particles in the target. In a further aspect, the particle shooter can be located at any point of the nanotube.

According to another embodiment, a method for aiming a particle shooter is provided comprising positioning a nanotube toward a target; shooting a particle from the nanotube towards the target at a low power; sensing where the particle hits; and re-positioning the nanotube based on the step of sensing where the particle hits. In one aspect, the sensing includes detecting whether the particle hits a particle in the target directly, travels through a center of a hexagon in the particle, travels through a bond between particles, or hits the bond directly. In another aspect, the method further comprises shooting another particle from the nanotube towards the target at a higher power after the nanotube has been aligned with the target. In a further aspect, the particle shot at a higher power hits a particle in the target and displaces, replaces, and/or is deposited on the particle in the target to create a new layer.

According to another embodiment, a method is provided for additive/subtractive manufacturing comprising positioning a nanotube toward a target; shooting a particle down the nanotube at low power at the target; sensing where the particle hits with regard to the target; if sensing indicates that target was not directly hit, re-positioning the nanotube and repeating shooting a particle at low power at the target and sensing where the particle hits with regard to the target; and if sensing indicates that target was directly hit, shooting a particle down the nanotube at high power at the target so that the particle couples with the target to build a layer on the target. In a further aspect, after the particles couple with the target, the method further comprises re-positioning the nanotube to a new position towards the target and repeating the above steps. In yet a further aspect, the method further comprises repeating the above steps until a layer is formed. In still a further aspect, the method further comprises repeating the above steps until the layers on the target form

BRIEF DESCRIPTION OF THE DRAWINGS

FIGS. 8A1, 8A2, 8B, 8C and 8D illustrate an embodiment showing one or more particles removed from the target as a result of being hit by a particle from the nanotube particle device of the disclosed embodiments.

DETAILED DESCRIPTION

Figure 1:
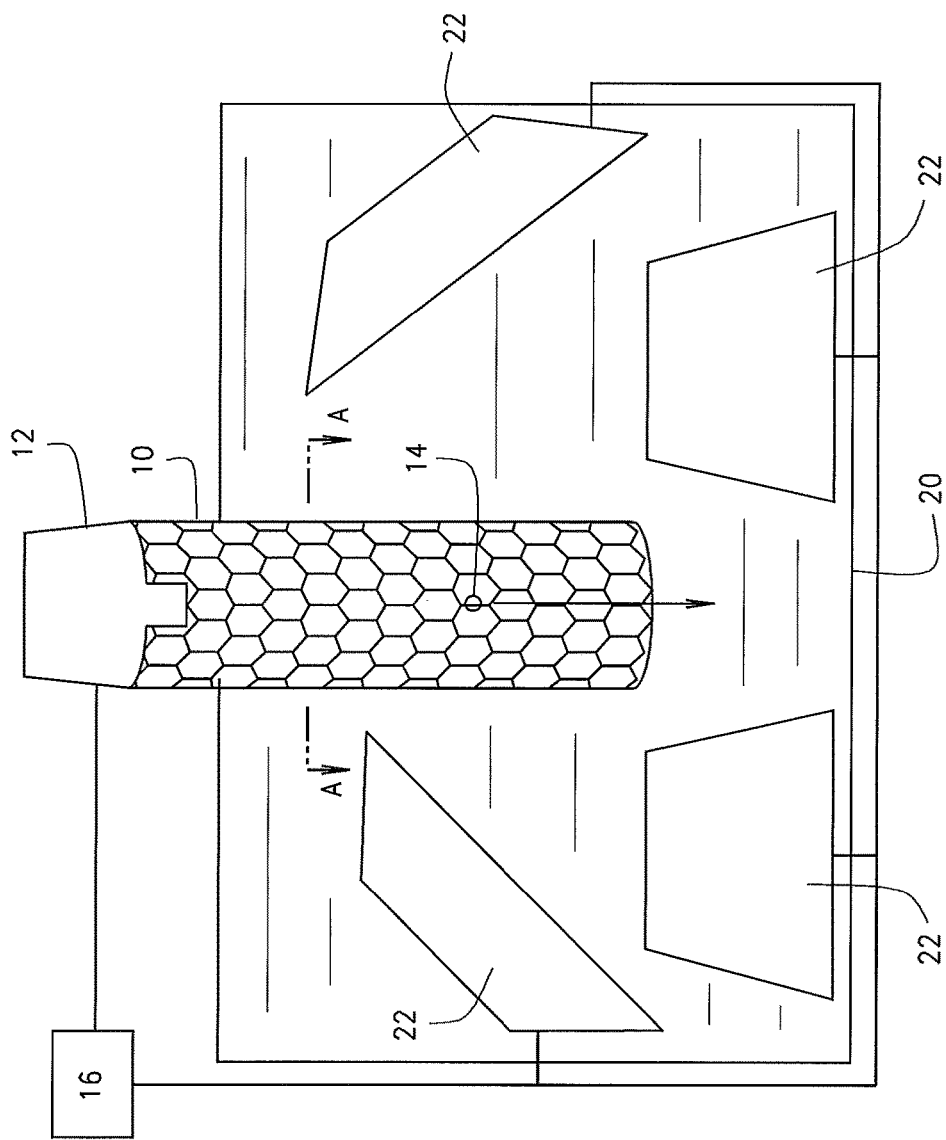
FIG. 1 is an illustration of a perspective view of a nanotube particle device according to the disclosed embodiments.

The disclosed embodiments of the disclosure relate to a nanotube device, an aimer and/or a shooter. Such an aimer or shooter can be used for 2D or 3D printing, or for an atomic or a molecular additive and/or subtractive manufacturing process. In a further embodiment, such a device, aimer or shooter is used for a doping process, such as for example doping used during transistor or semiconductor fabrication. In still a further embodiment, such a device, aimer or shooter is used for biological applications such as, for example, building enzymes, protein synthesis or DNA synthesis FIG. 1 is an example of one embodiment of a nanotube device, aimer or shooter of the disclosure. The embodiment shown in FIG. 1 includes a nanotube 10. The nanotube can be, for example, a carbon nanotube. The nanotube can be of various diameters and have multiple walls. In an embodiment, a particle shooter 12 is coupled to one end of nanotube 10. Particle shooter 12 can be coupled mechanically and/or optically to nanotube 10. The coupling of the particle shooter to the nanotube can, for example, be done by a number of standard optical elements which typically involve focusing the emission size of the particle shooter to a small enough diameter that the particles will get into the nanotube. In an alternative embodiment, the particle shooter is located in a position separate from, such as above, the nanotube. In a further embodiment, the particle shooter is aimed into a MEMS (MicroElectroMechanicalSystems) device, such as, for example, a reflective mirror that has X-Y directionality controls. The particle shooter emits particles to the MEMS. The MEMS has an X-Y controlling mechanism that aims/angles the particles directly into the nanotube.

Figure 2:
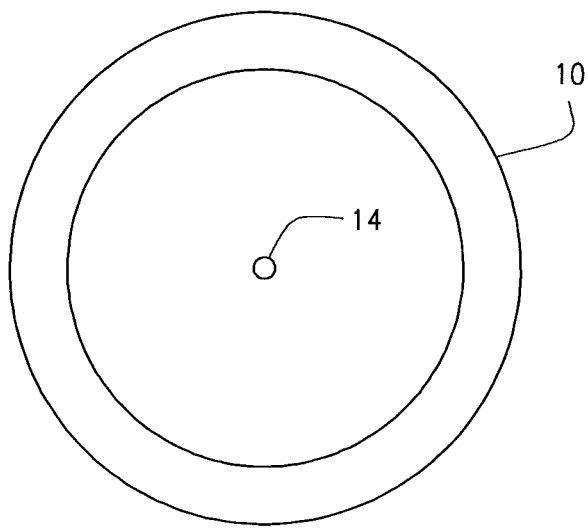
FIG. 2 is an illustration of a sectional view through A-A' of the nanotube particle device of FIG. 1.

The particle shooter is intended to shoot, send, accelerate or transmit a single particle 14 down, i.e. from approximately one end of nanotube 10 to other end of the nanotube, as shown in FIGS. 1 and 2. Alternatively, more than one particle or a stream of particles can be shot down the nanotube. In an embodiment, to ensure that particle travels down the nanotube, the energy and momentum of the particle is adjusted so that it does not have enough energy to break through the nanotube wall. With the momentum that is initially established to enter the nanotube, since the particle cannot break through the wall, it will have to travel to the other end where it will exit the nanotube. In a further embodiment, the index of refraction of the path the particle is traveling from the particle shooter to the nanotube wall is less than 20 degrees.

In a further embodiment, the particle shooter is a laser. The laser "shoots" the particles by emitting particles such as photons. The number of particles or photons emitted per second is equivalent to the laser power, and can be modified by standard intensity controls. Examples of possible lasers to be used with the nanotube include a pulsed laser, a continuous laser, a semiconductor, and a light emitting device (LED). In a further embodiment, the laser can be one that can be turned on/off or the power adjusted. In a further embodiment, the frequency and/or the intensity of the laser can be varied. In a still further embodiment, the format of the laser, such as, for example, continuous or pulsed, can be varied.

Examples of particles which can be shot, sent, accelerated or transmitted down the nanotube include a photon, an electron, a proton, an atom, and a molecule. Alternatively, small groups of atoms or nanoparticles of atoms, such as, for example, a 3×3 atomic cube are shot down the nanotube. It is noted that for some quantities of such particles, such as a single particle or a discrete or small stream of particles, it may be easier to detect the resulting vibrations and time delays when the particle or stream collides with the target, than for a non-discrete quantity of particles.

Figure 3A:
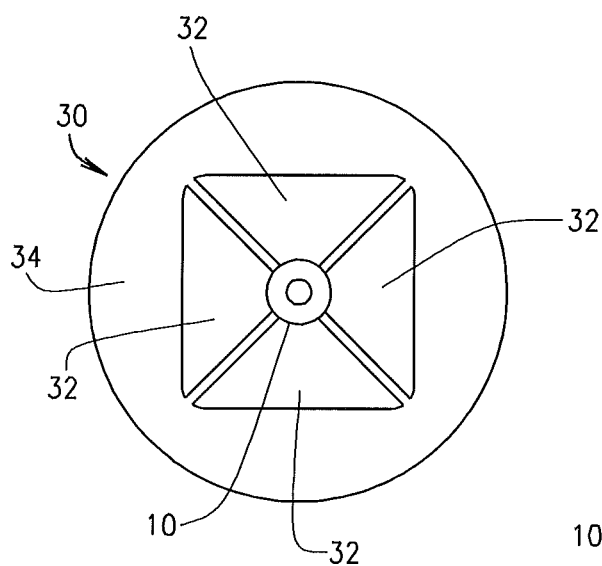
FIGS. 3A-3B are illustrations of a piezoelectric.
Figure 3B:
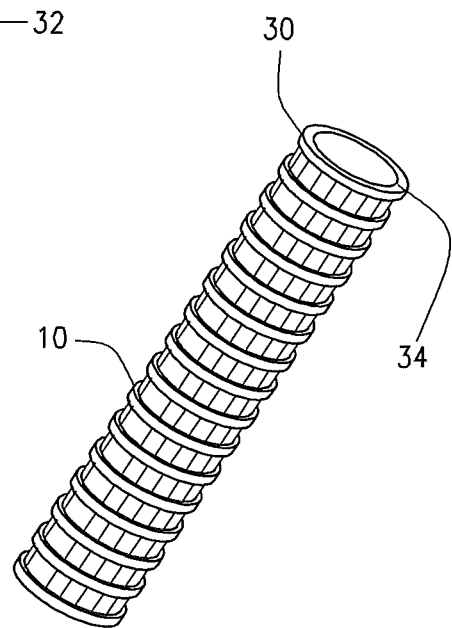

In one embodiment of the disclosure, a positioning mechanism 16 is coupled to nanotube 10. Examples of possible positioning mechanisms include a mechanical coupling, an electrostatic coupling, and/or an electromagnetic coupling. In a further embodiment, the positioning mechanism can be a mechanical arm. The positioning mechanism can be coupled to any point on nanotube 10. In another embodiment, the position mechanism can be a piezoelectric (PZT) which provides a device for accurate movement of the nanotube. PZT's are solid state crystal structures that deform when there is an external field applied. The deformation allows a linear displacement. Three of the solid state crystal PZT structures in the XYZ configuration can provide for accurate positioning of the nanotube. An example of a PZT is shown in FIG. 3. In FIG. 3A, a PZT 30 has, e.g., 4 piezo crystals 30 affixed to a flexible membrane 32. The PZT 30 can be located at, for example, the top of nanotube 10 as shown in FIG. 3B. The piezo crystals can be used to precisely move and aim the nanotube.

Positioning mechanism 16 moves nanotube 10 to desired locations based on information gathered during the initial shooting of particle 14 down nanotube 10. The positioning mechanism can move the nanotube in the X-Y or X-Y-Z directions. In a further embodiment shown in FIG. 4, an X-Y-Z axis control mechanism 18 can be coupled to positioning mechanism 16 to control the movement in the X-Y-Z direction. In an alternative embodiment, the target can be moved based on the information gathered during the shooting of the particle down the nanotube. In a further embodiment, both the nanotube and/or the target can be moved based on the information gathered during the shooting of the particle down the nanotube.

Located at the other end of nanotube 10, opposite particle shooter 12, is a target 20. The distance from the nanotube to the target can vary based on, e.g., the size, makeup and velocity of the particles, both particles shot from the nanotube and particles in the target. Possible examples of a target include one of more layers of graphene, a graphene sheet, a nanotube, a fullerene, a semiconductor, and a substrate. In another example, the target is one of a biological nature such as, for example, building enzymes, protein synthesis, and DNA synthesis. In a further embodiment, each of the above targets is a layer or layers of previously deposited particles.

Figure 4:
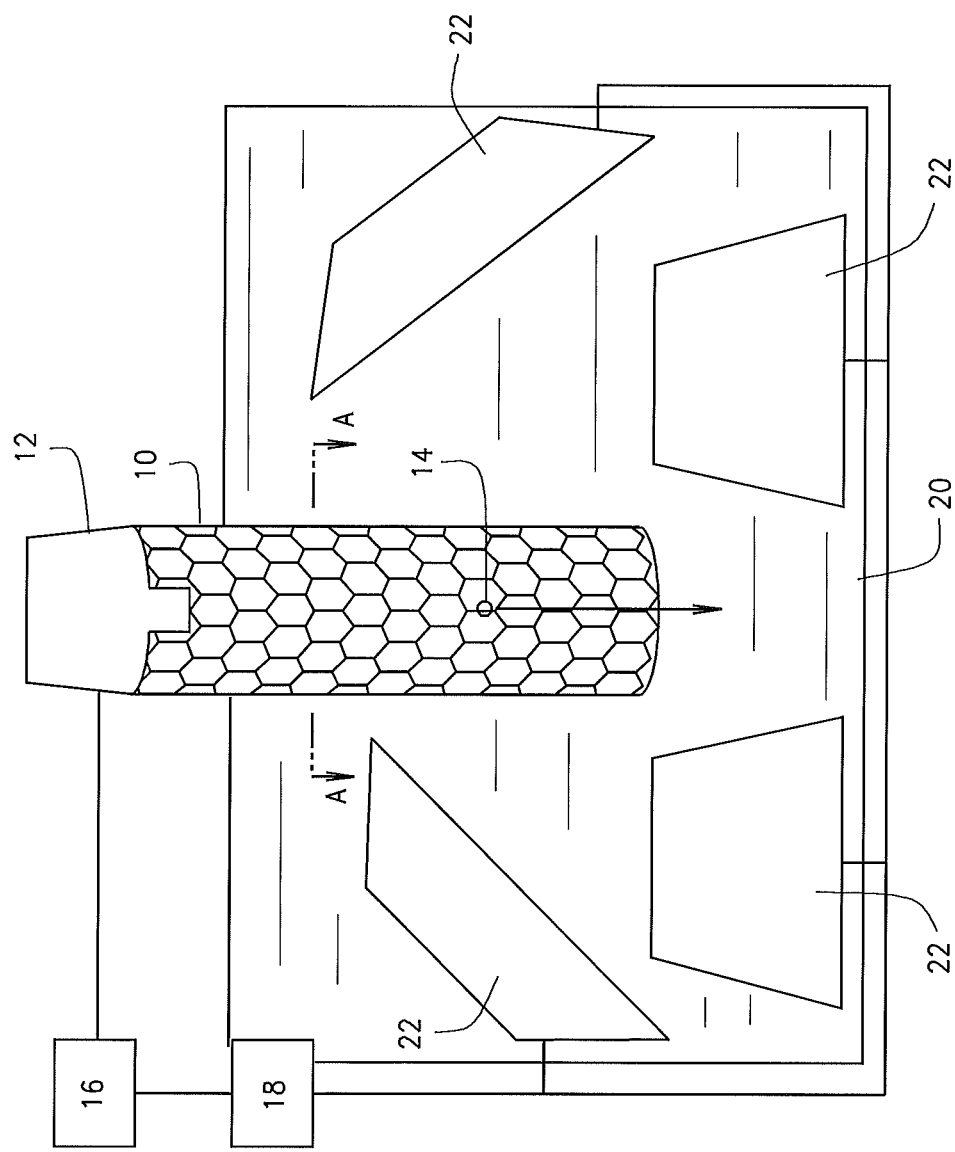
FIG. 4 is an illustration of a further embodiment of a nanotube particle device.

In a further embodiment, a detection sensor 22 is utilized in the device of the present disclosure. The detection sensor can be located above, below, or both above and below the target. FIGS. 1 and 4 show detection sensor 18 at multiple locations. One or more of the detection locations and sensors can be used in the disclosed embodiments. In addition or alternatively, the detection sensor can be located in the same plane as the target. The detection sensor senses, for example, physical, optical, heat, electrical or electromagnetic, Doppler, and/or interference oscillations, vibrations, effects that occur when the particle hits the target. The detection sensor then measures the oscillations, vibrations, and/or effects and provides the information regarding the position of the shot particle to the target to positioning mechanism 16. In another embodiment, detection sensor 22 provides the information to X-Y-Z controller 18 which then uses that information to instruct positioning mechanism 16 in guiding nanotube 10 to the correct position. In a further embodiment, a feedback circuit is located between detection sensor 22 and X-Y-Z controller 18 or positioning mechanism 16. One example of a detection sensor is a laser vibrometer. In one embodiment, the detection sensor includes a measurement system. In another embodiment, the measurement system is separate from the detection sensor. In both of the above embodiments, the system will convert physical, optical, electrical, and/or electromagnetic variations into typically an electrical signal (either analog or digital) that can be used to control the movement system. The positioning mechanism then adjusts the relative location of the nanotube (via X-, Y-, and Z-axes) based on this information.

As mentioned above, one or more detection sensors 22 can be placed at various strategic locations to detect and measure the intensity, frequency, and differences in time delays of the physical, optical, electromagnetic, and photonic vibration/oscillation/effect. In another embodiment, light/photonic and electromagnetic sensors is located above and below the target, while physical and electrical vibration sensors are physically coupled directly on the target.

Figure 5:
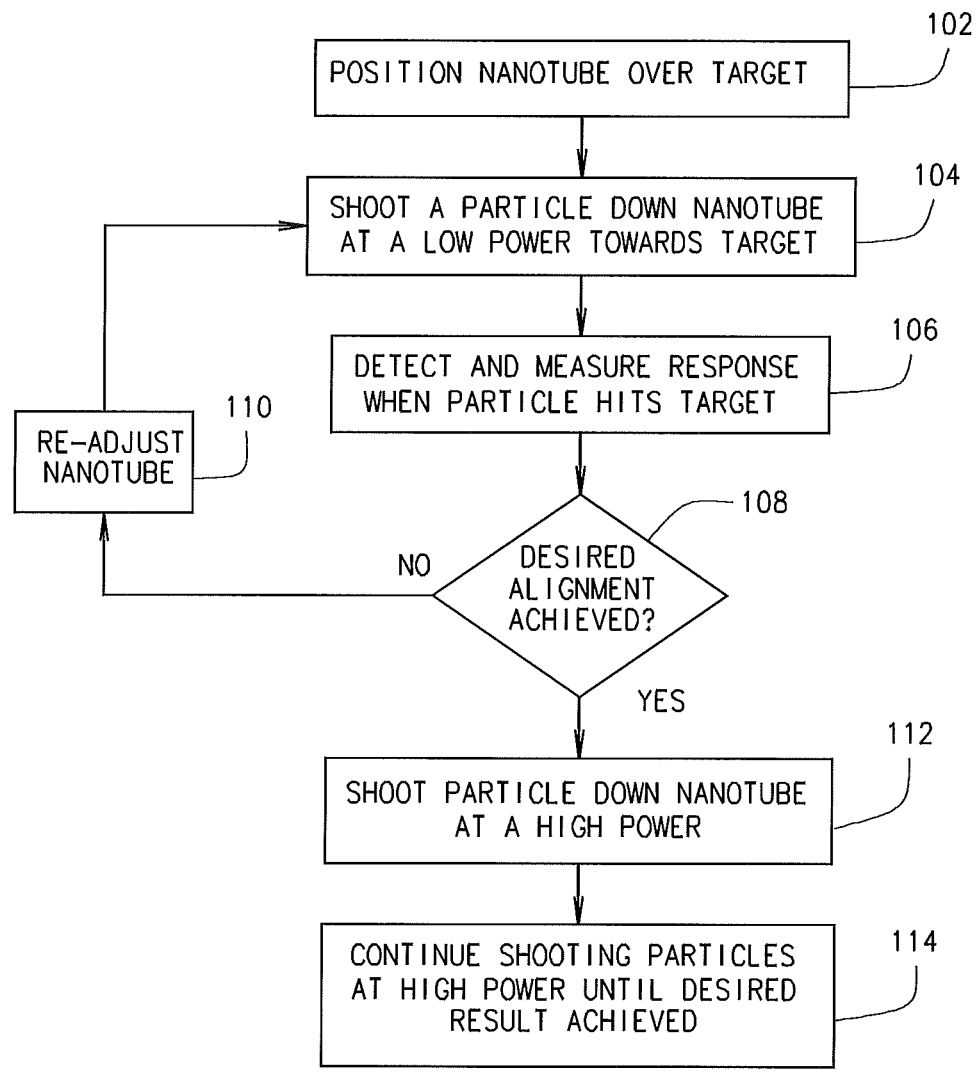
FIG. 5 is a flowchart illustrating a method of the disclosed embodiments.
Figure 6A:
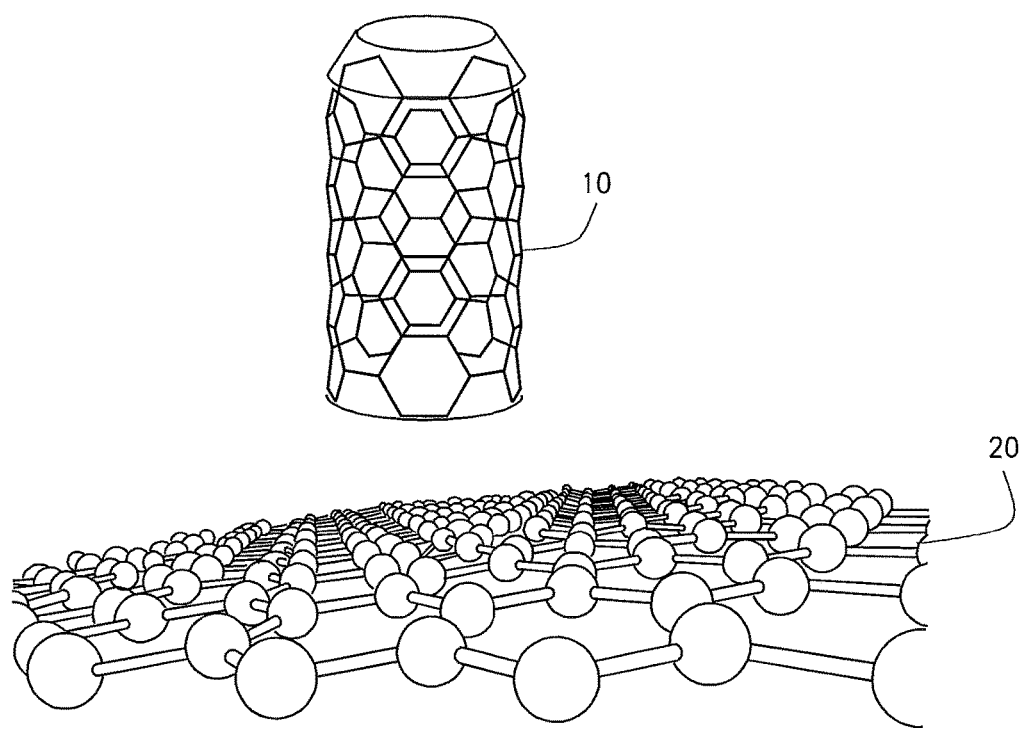
FIGS. 6A-6C illustrates a perspective view in a method at the discolored embodiments.
Figure 6B:
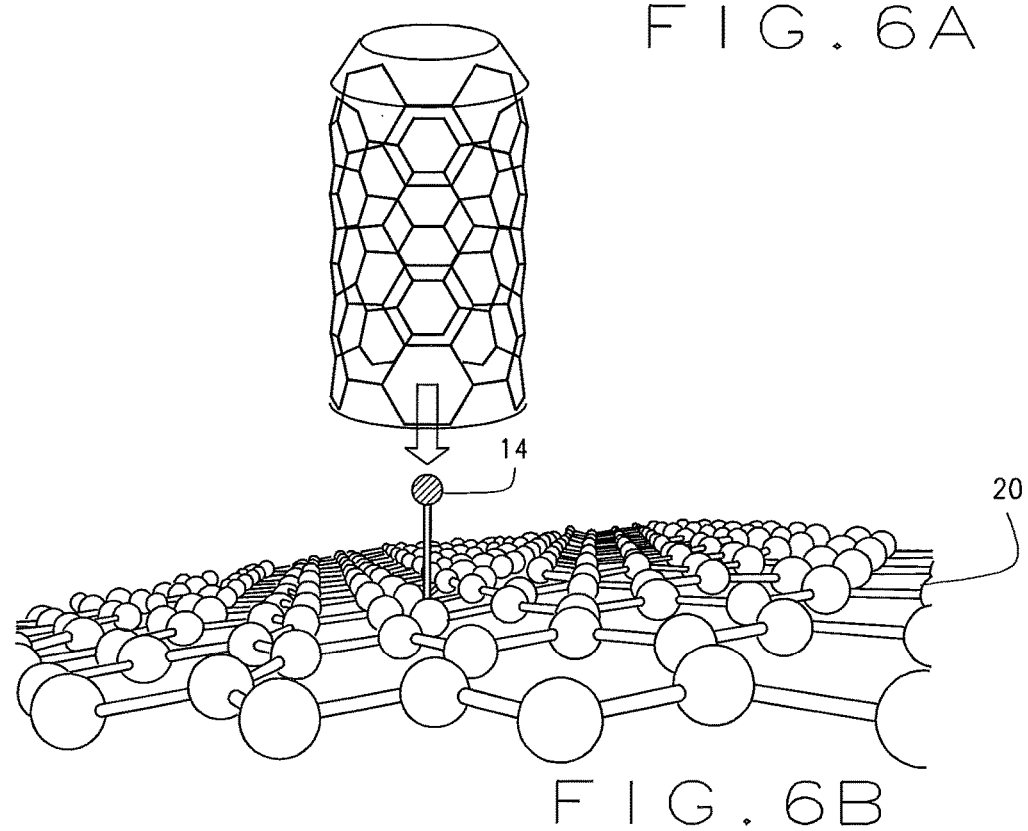
Figure 6C:
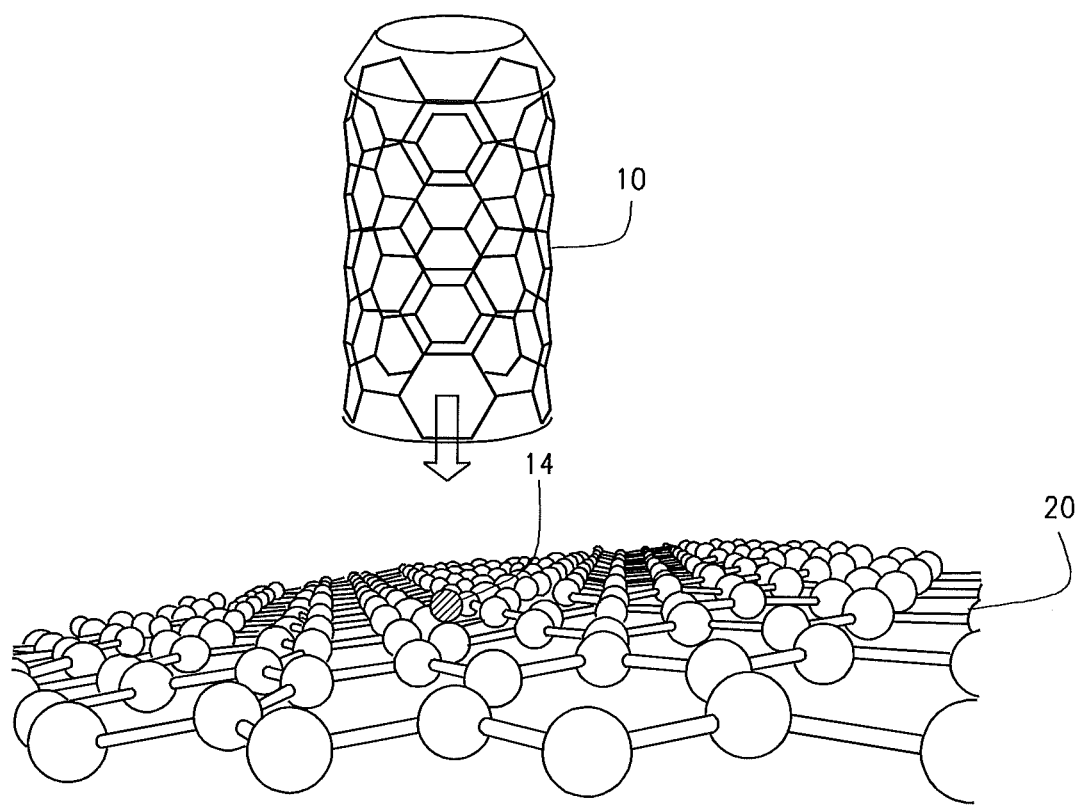
Figure 7:
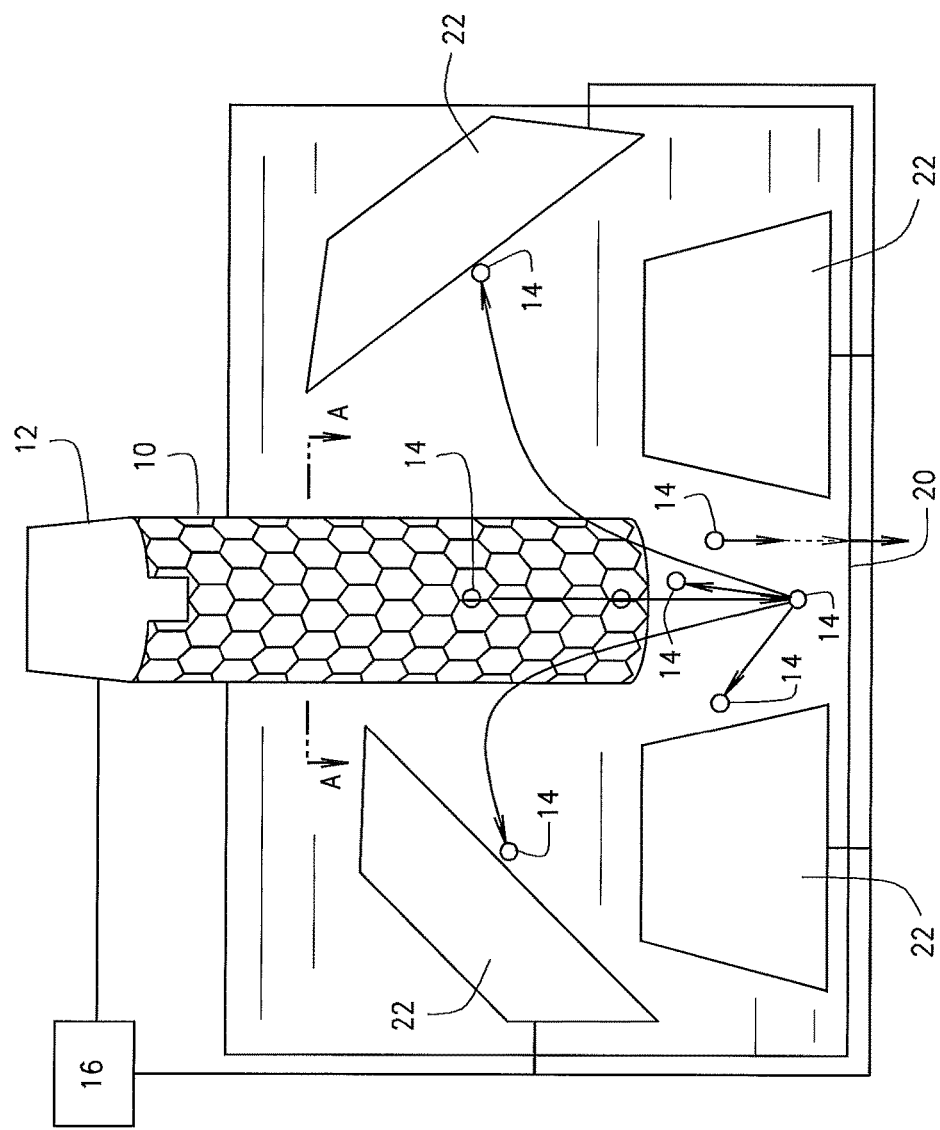
FIG. 7 illustrates examples of how a particle can react after colliding with a target.

FIG. 5 illustrates the overall steps in an embodiment of a method of the disclosure of aiming the nanotube particle device and then building with the particle device. In step 102, nanotube 10 is positioned towards target 20. See FIG. 6A. Thereafter, in step 104, a particle 14 is shot from particle shooter 12 down nanotube 10 to the other end of the nanotube and towards target 20. See FIG. 6B. In one embodiment, particle shooter 12 is set at a low power, for example, a power which is low enough to not create a hole in the target. Such a level will vary depending on the strength of the bonds in the target. An example of such a low power is approximately 10 eV. A particle or particle stream 14 is then shot at this low power. The particle is shot at the target to discover where the particle hits on the target. See FIG. 6C. In step 106, detection sensor 22 detects the hit. FIG. 7 illustrates examples of how a particle 14 can react after colliding with the target 20 and how detection sensor 22 can be positioned to detect the collision. Then, in step 108, a determination is made whether the desired alignment is achieved based on the detected information.

For example, when the particle (or stream of particles) hits an atom or particle in the target, the shot particle reflects off the target atom/particle at various angles depending on where the shot particle hit. Detection sensor 22 can then be used to detect and measure the location of the hit atom/particle. For example, physical, electrical/electromagnetic, and possibly optical oscillations/vibrations/effects occur to the hit atom/particle that the shot particle hits, based on how hard the atom/particle is hit, and the angle which the hit occurs. In a further embodiment, the optical oscillations/vibrations/effects are in the infrared (IR) frequency range of the electromagnetic spectrum. The oscillations/vibrations/effects spread out into and through the material and potentially (optical and electromagnetic) into the surrounding three dimensional space. Measurements can then be made based on the amplitude, intensity, frequency, phase, and time delay differences of the oscillations/vibrations/effects. Measurements can also be made based on how long the hit atom/particle vibrates/oscillates. Detector sensor 22 can also be configured to optically detect the collision between the shot particle and the hit atom/particle. Using this information, it can be computed which atom or particle in the target was hit and where it was hit. If the hit atom/particle was hit tangentially, the tangential collision is detected, and the position adjusted for a more direct hit. A direct hit indicates that the nanotube is properly aligned.

Alternatively to a direct hit, shot particle 14 travels through the center of the hexagon in, e.g., an atom or particle of the target. If this occurs, there would be minimal reflection and vibration, which can be observed and/or measured via detection sensor 22. In one embodiment, if detection sensors, such as, e.g., photonic and electromagnetic sensors, are located below the target, the sensors would detect particles or waves that came through without any collisions. This information would indicate that the particle missed the desired portion of the particle and the nanotube position needs to be adjusted.

In another alternative, shot particle 14 could travel through a bond between atoms without hitting an atom. If this occurs, the collision between the particle and the bond will create a detectable interaction between the atoms. For example, when the particle strikes or travels through a bond, it will cause the two atoms on each side of the bond to oscillate/vibrate at a detectable amplitude, frequency, and time delay. The amplitudes, frequencies, and time delays differ in each atom depending upon how close to each atom the particle was when it passed through and temporarily interfered with the bond.

For example, when the particle temporarily passes through the bond at the midpoint between the two atoms, it temporarily breaks the bond and causes both atoms to vibrate equally and at the same frequencies, since they cause the same "interruption" or interference to each atom. The differences in time delays to the various sensors enable one to pinpoint which atoms and atomic bonds were affected. In another example, when the particle temporarily passes through the bond at the ⅓ point closest to atom A, and the ⅔ point from atom B, then atom A which is closest to the particle-bond break will vibrate/oscillate more strongly and/or at a higher amplitude and at a slightly different frequency than atom B. Information from the collisions with the bond between atoms indicates that the particle missed the desired portion of the particle and that the nanotube's position needs to be adjusted.

If the desired alignment is not achieved, then in step 110, the X-, Y-, and/or Z-position of the nanotube is adjusted based on the detected information. Steps 104-108 would then be repeated. If the desired alignment is still not achieved, then step 110 and then steps 104-108 are repeated until the desired alignment is achieved.

In a further embodiment and further step 112, once the desired alignment is achieved, a second particle or stream of particles is shot down the nanotube at a higher power so as to remove, displace or grow-on the "aimed-at" atom or particle in the target. This second particle or stream can be shot by particle shooter 14 or another particle shooter, such as, for example, a second laser which is located in particle shooter 12 in FIG. 1. The second particle can be the same type as the first particle or a different type of particle. In one embodiment, the second particle is a heavier particle. This second particle, shot at higher power, then directly strikes a particle in the target. Several results are possible with the shot second particle or stream.

Figure 8B:
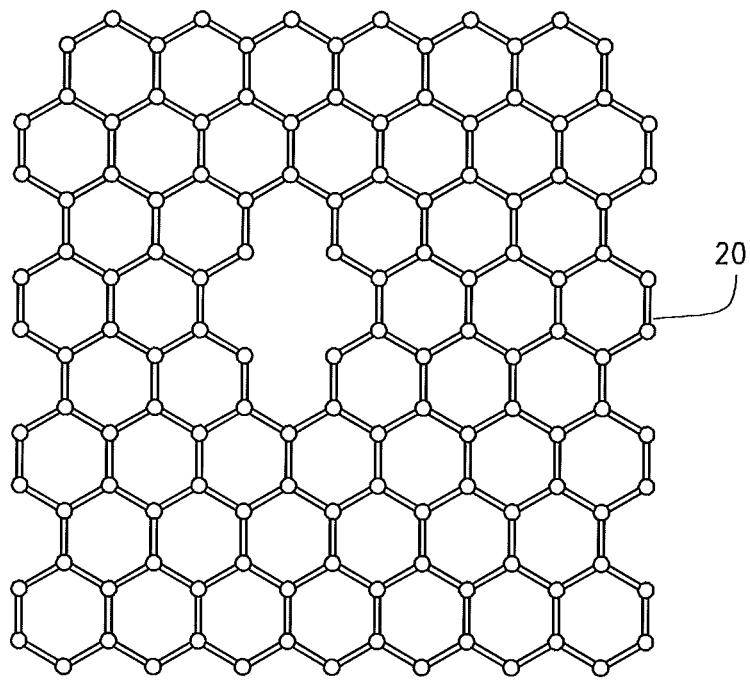
Figure 8C:
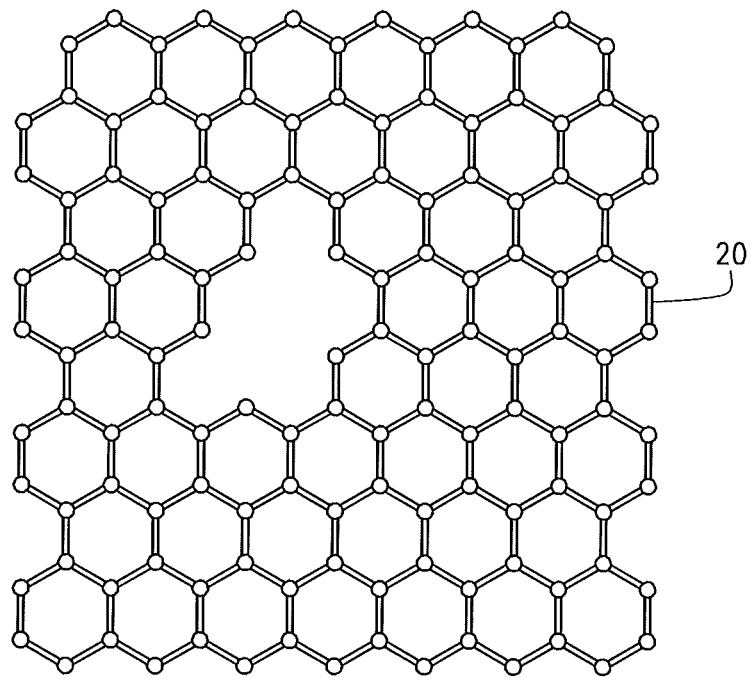
Figure 8D:
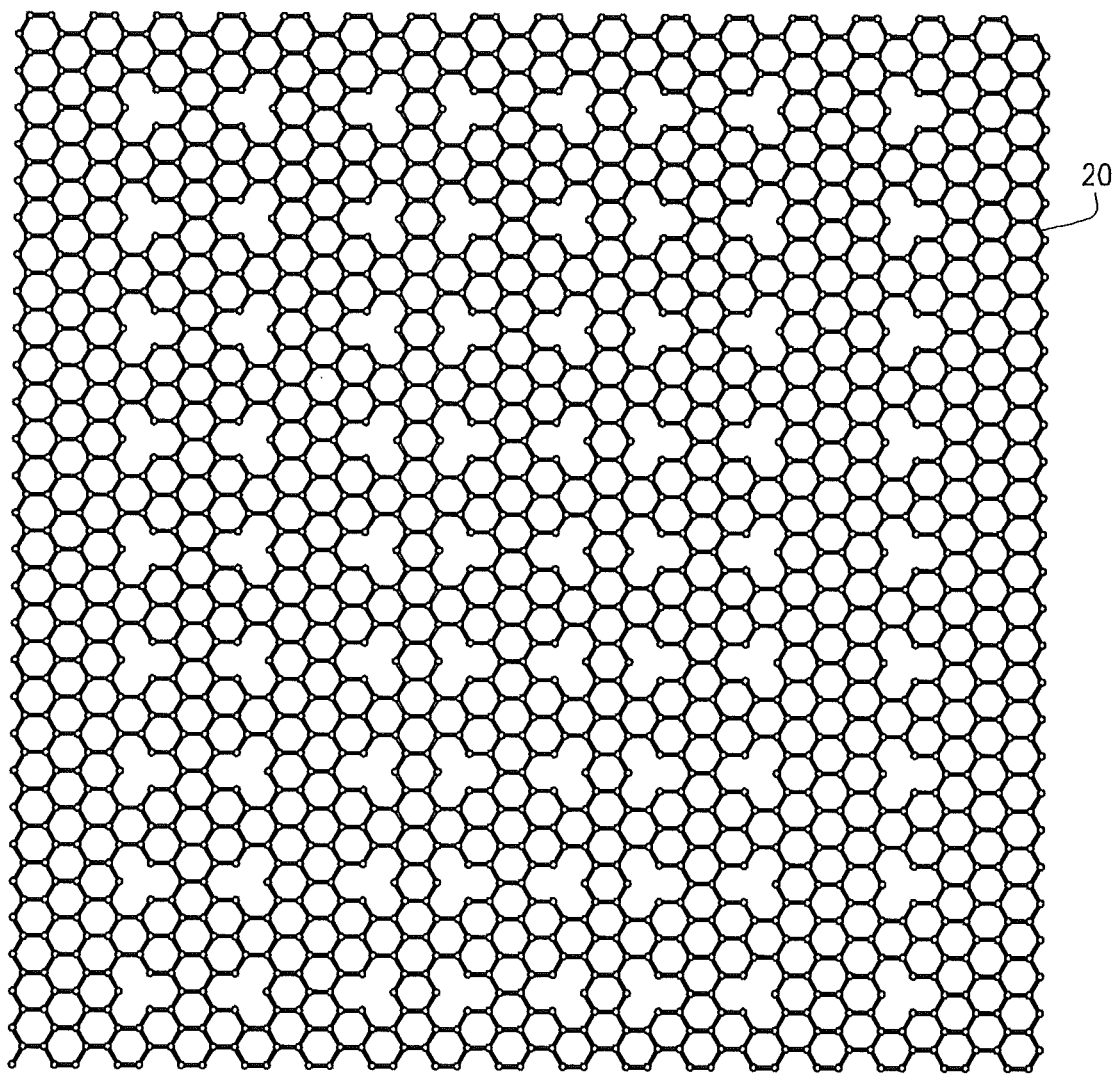

In one embodiment, the second particle removes or "knocks-out" an existing particle in the target (for example, to create a hole in a graphene sheet). An example of this is shown in FIG. 8A1 where an existing particle has been knocked out of a graphene target. FIG. 8A2 shows a perspective view of this. FIG. 8B shows an example where two adjacent existing particles have been knocked out of a graphene target. In such a case, the nanotube of the disclosure is aligned with a particle in the graphene sheet as described supra. Once aligned, a second particle/stream is shot at the target, and the desired existing particle in the target is knocked out. The nanotube is then aligned with a second adjacent existing particle in the graphene sheet. The same method is used to remove or knock-out three adjacent existing particles in the target as shown, for example, in FIG. 8C. This method can also be used to create a pattern of knocked-out particles for an entire sheet as shown, for example, in FIG. 8D.

Figure 9:
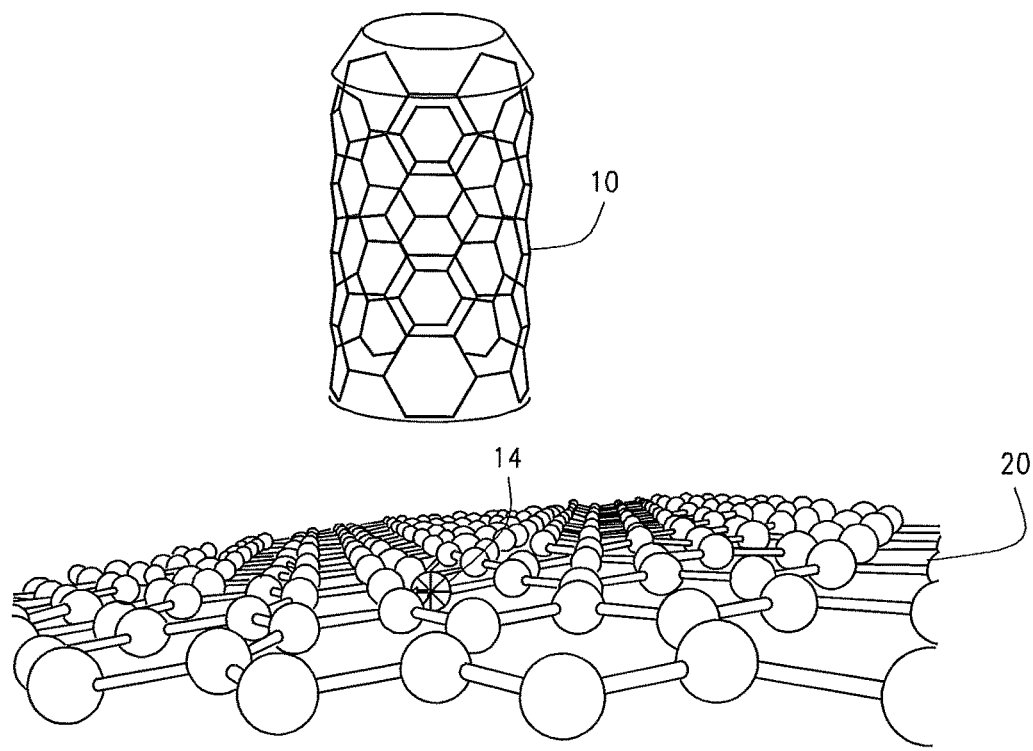
FIG. 9 illustrates an embodiment where a particle shot from the nanotube particle device replaces a particle in the target.

Alternately, the second particle shot from the nanotube replaces the existing particle in the target by "knocking out" the existing particle and replacing it. This is shown, for example, in FIG. 9. In a further embodiment, the second particle removes the existing particle leaving a hole as discussed above, then another shot particle builds or positions itself in the hole.

Figure 10:
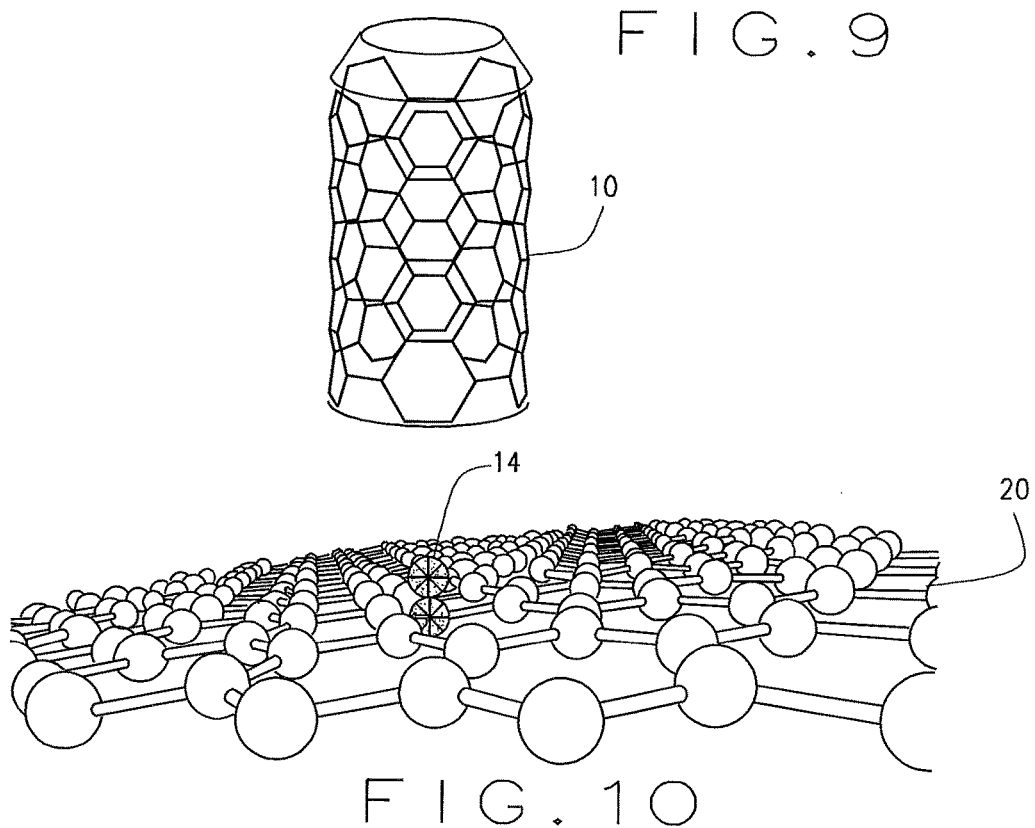
FIG. 10 illustrates an embodiment where a particle sheet from the nanotube particle device builds on a particle in the target.

In another alternative, the second particle builds on an existing particle in the target without knocking it out or removing it from the target. This is shown, for example, in FIG. 10. In step 114, this process can then be continued until the desired structure is achieved, such as, for example, a new layer is formed. To build, for example, a 3D material, this process can be repeated to build multiple layers into the desired 3D shape.

If it is desired to remove the particle in the target, then the shot particle is shot at a higher power than if it is desired to build on the particle in the target. The power used to build a shot particle on a target particle is generally higher than the low power used initially to aim the particle device.

In a further embodiment, depending upon the particular application, it may be desirable to break the molecular or atomic bonds in the underlying material. In another case, it may be desirable to interpose an atom within the existing structure. In another application, it may be desirable to create a hole in the substrate. In each of the above cases, the nanotube particle device of the disclosed embodiment can be used. The difference will be in the energy associated with the particular atom as it is accelerating towards the target's surface. A relatively small kinetic energy imparted to the particle will result in the particle only breaking or reconfiguring some of the atomic bonds at the surface, with the particle itself bouncing off the surface. A slightly higher kinetic energy will allow the particle to be interstitially interjected into the target's surface, while largely maintaining the configuration of the surrounding atomic bonds. The highest kinetic energy would allow the particle to blast completely through the substrate or target's surface, with sufficient energy that knocks out surrounding atoms, causing the surrounding atoms and molecules to reconfigure their bondings about the hole that is created.

This description has been offered for illustrative purposes only and is not intended to limit the invention of this application.

All mentioned documents are incorporated by reference as if herein written. When introducing elements of the present invention or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this invention has been described with respect to specific embodiments, the details of these embodiments are not to be construed as limitations.

What is claimed as new and desired to be protected by Letters Patent is set forth in the appended claims.

What is claimed is:

1. A nanotube particle device comprising:
a nanotube having a first end and a second end;
particle shooter, wherein the particle shooter is coupled to the first end of the nanotube and wherein the particle shooter is configured to shoot a particle from the nanotube to a target located beyond the second end of the nanotube;
a positioning mechanism, wherein the positioning mechanism is configured to position the nanotube in relation to the target; and
a detection sensor, wherein the detection sensor is configured to receive and transmit energy or movement, emanating from an interaction between the particle and the target, to the positioning mechanism to determine the relative position of the nanotube device to the target,
wherein the positioning mechanism comprises an electrostatic coupling, an electromagnetic coupling, or a piezoelectric coupling.

2. The nanotube particle device of claim 1, wherein the nanotube is a carbon nanotube.

3. The nanotube particle device of claim 1 wherein the particle is selected from the group comprising of a photon, an electron, a proton, an atom, and a molecule.

4. The nanotube particle device of claim 1, wherein the particle shooter is a laser.

5. The nanotube particle device of claim 4, wherein the laser is selected from the group comprising a pulsed laser, a continuous laser, an LED, an adjustable power laser, and an adjustable wavelength laser.

6. The nanotube particle device of claim 1, wherein the positioning mechanism is a piezoelectric.

7. The nanotube particle device of claim 1, wherein the nanotube is positioned to aim particles at specific areas of the target selected from the group comprising a single atom, a bond between atoms, space between atoms, an atom-bond, multiple bonds, multiple atom-bonds, a molecule, and a group of molecules.

8. The nanotube particle device of claim 1, wherein the target is selected from the group comprising graphene, a graphene sheet, a nanotube, a fullerene, a semiconductor, a substrate and multiple layers of each.

9. The nanotube particle device of claim 1, wherein the detection sensor is a system of sensors comprising sensors for sensing energy or movement selected from the group comprising optical, mechanical, vibrational, electrical, heat-sensing, and electro-magnetic energy and movement.

10. The nanotube particle device of claim 1, wherein the detection sensor is located above, below, both above and below, or in the same plane as the target.

11. The nanotube particle device of claim 1, wherein the particle shooter is configured to shoot a particle at a first power for positioning the nanotube, and wherein the particle shooter is configured to shoot one or more particles at a second power for displacing one or more particles in the target.

12. The nanotube particle device of claim 1, wherein the particle shooter comprises two lasers, a first laser configured to shoot a particle at a first power for positioning the nanotube, and a second laser configured to shoot one or more particles at a second power to displace one or more particles in the target.

13. A nanotube particle device comprising:
a nanotube having a first end and a second end;
particle shooter, wherein the particle shooter is coupled to the first end of the nanotube and wherein the particle shooter is configured to shoot a particle from the nanotube to a target located beyond the second end of the nanotube;
a positioning mechanism, wherein the positioning mechanism is configured to position the nanotube in relation to the target; and
a detection sensor, wherein the detection sensor is configured to receive and transmit energy or movement, emanating from an interaction between the particle and the target, to the positioning mechanism to determine the relative position of the nanotube device to the target,
wherein the particle shooter comprises a first laser configured to shoot a particle at a first power for positioning the nanotube, and a second laser configured to shoot one or more particles at a second power to displace one or more particles in the target.

* * * * *